UNITED STATES PATENT OFFICE 2,576,850

GELLING OF POLYMERIC COMPOUNDS

Otis Willard Murray, Fords, N. J., assignor to E. I. du Pont de Nemours & Company, Wilmington, Del., a corporation of Delaware No Drawing. Application April 26, 1945, Serial No. 590,525

8 Claims. (Cl. 95—7)

This invention relates to the gelling of hydroxyl polymer compounds and compositions which contain a large number of

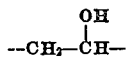

radicals or units per molecule. More particularly it relates to the gelling of such compounds with acylacetamides and to the production of photographic layers and elements therefrom.

An object of this invention is to provide new methods for gelling hydroxyl polymer compounds. A further object is to provide photographic elements with layers composed of gelled hydroxyl polymer compounds. A still further object is to provide such layers which contain light-sensitive silver salts and are capable of yielding dye images during color coupling development. Still other objects will be apparent from the following description of the invention.

It has been found that hydroxyl polymer compounds which contain a large number of

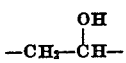

radicals per molecule and do not have good gelling characteristics of the water-soluble or hydrophilic type can be converted into rigid gels by treating them with an acylacetamide. This may be accomplished in a practical manner by treating the hydroxyl polymers with an aqueous solution and preferably an aqueous alkaline solution of the salts.

Thus hydroxyl polymers such as polyvinyl alcohol and partially and completely hydrolyzed polyvinyl esters, e. g., polyvinyl acetate, polyvinyl chloracetate and interpolymers of such esters with unsaturated compounds such as vinyl chloride, styrene, acrylic acid esters and monoolefines, e. g., ethylene, etc. which do not exhibit good gelling characteristics can be converted into modified products which form satisfactory rigid gels and thin gelled layers by treatment with an acylacetamide and preferably with an aqueous solution containing an acylacetamide. When the amount of acylacetamide used is low, e. g., less than 5% by weight of the hydroxyl polymer treated, then thermo reversible gels are formed. When relatively high amounts of such compounds are used, irreversible gels are formed.

In accordance with one aspect of the invention, color yielding colloid compositions and layers can be made by using as the acylacetamide one which forms a satisfactory quinoneimine or azomethine dye on color coupling with the oxidation products formed during the development of developable silver salt images. Such acylacetamides also couple with diazonium salts to form azo dyes. The acylacetamide is preferably used in the form of the alkali metal salt. This may advantageously be accomplished by means of an aqueous alkali metal hydroxide solution of the acylacetamide. Water-miscible monohydric alcohols may be present in the solution.

The hydroxyl polymer compound can be treated in the form of a solution, emulsion or dispersion by admixing the acylacetamide compound or an aqueous solution thereof and the resulting solution coated on any suitable support to form a layer. Alternatively layers of the hydroxyl polymers that previously had been formed can be treated with an aqueous solution of the acylacetamide compound. In the latter case it is often desirable to wet the layer of hydroxyl polymer with water or water-alcohol mixtures before applying the solution of the acylacetamide.

The solutions, emulsions, dispersions or layers may contain various chemical compounds or materials prior to their treatment with acylacetamides. Thus they may be complete photographic emulsions and contain light-sensitive silver salts, sensitizing dyes, emulsion sensitizers, etc.

The invention will be further illustrated by the following examples. The parts are by weight.

Example I

An ammoniacal silver nitrate solution is prepared by adding concentrated ammonium hydroxide to 20 parts of an aqueous solution containing 11 parts of silver nitrate until the precipitate of silver hydroxide disappears. Two parts of a 1% aqueous sodium dodecyl sulfate solution is then added. The resulting "converted" silver nitrate solution and a solution of 6.6 parts of ammonium bromide, 0.3 part of potassium iodide and 0.02 part of sodium dodecyl sulfate in approximately 30 parts of water are added simultaneously in fine streams to a stirred solution of 4 parts of completely hydrolyzed ethylene/vinyl acetate polymer having a mol ratio of 0.07 of ethylene to 1. of vinyl acetate in the original interpolymer in 32 parts of water and 4 parts of ethanol. The temperature is held at 45° C. during the precipitation and for a period of 15-60 minutes after completion thereof. The silver halide emulsion is coagulated by running in a fine stream of acetone (300-400 parts) at room temperature. The coagulate is then washed 6 times with fresh portions of water (400 parts) at 10-minute intervals. The washed emulsion is dissolved by stirring at 60° C. for 15–60 minutes with 10 parts of ethanol and 40 parts of a 10% solution of the original completely hydrolyzed interpolymer of ethylene/vinyl acetate of mol ratio 0.07 in water containing 11% ethanol. The emulsions are coated on heavy white baryta-coated paper and dried in warm dry air.

A negative picture is printed by projection onto the silver bromide printing paper just described and then developed in the following solution:

| | | |
|---|---|---|
| Water | parts | 500 |
| P-methylaminophenol sulfate | do | 2 |
| Anhydrous sodium sulfite | do | 45 |
| Hydroquinone | do | 12 |
| Anhydrous sodium carbonate | do | 67.5 |
| Potassium bromide | do | 1.9 |
| Add water to make | ccs | 1000 |

The hydrophilic interpolymer of this example can be made by the process described in United States applications Serial No. 528,945, filed March 31, 1944, now Patent 2,397,866, the applications referred to therein, and Serial No. 577,736, filed February 13, 1945, now Patent 2,386,347.

The emulsion layer was overcoated immediately after formation and while it was still wet with the following solution at room temperature:

| | | |
|---|---|---|
| N-furoylacet-N'-benzoylacetbenzidine | grams | 9 |
| 5 N NaOH | ccs | 12 |
| Ethanol | ccs | 72 |
| Water | ccs | 24 |

The emulsion layer instantly set into a firm gel. After drying the element was exposed to an object and color developed for five minutes in a bath of the following composition:

| | Parts |
|---|---|
| p-Aminodiethylaniline hydrochloride | 3 |
| Sodium carbonate | 25 |
| Sodium sulfite | 10 |
| Water to | 1000 |

The developed paper was then washed in water, bleached in 4% potassium ferricyanide solution, fixed in 25% sodium thiosulfate solution and washed. The resulting element contained a strong yellow dye image.

*Example II*

An untreated photographic paper photographic element as described in Example I was overcoated in a similar manner but with the following solution:

| | | |
|---|---|---|
| Acetoacetanilide | grams | 2 |
| Ethanol | ccs | 90 |
| Water | ccs | 10 |

The emulsion layer set into a soft gel in 1 minute. It was exposed and processed after the manner described in the previous example and a strong yellow dye image was formed. One-half of a strip of the resulting element was then immersed for 10 minutes in 5% aqueous $Na_2CO_3$ solution and washed. The entire strip was then color developed in the following solution:

| | | |
|---|---|---|
| Diethyl-p-phenylenediamine hydrochloride | grams | 2.0 |
| $Na_2CO_3$ | do | 25.0 |
| $Na_2SO_3$ | do | 8.0 |
| KBr | do | 2.0 |
| Water to | ccs | 1000 | and the color former was found to be fast to diffusion.

*Example III*

A photographic emulsion was prepared in a manner similar to that described in Example I but substituting for the hydrolyzed ethylene/vinyl acetate interpolymer, a hydrophilic color forming acetal, namely the polyvinyl acetal of N - (m - formylphenyl) -1-acetoxy-2-naphthalene-sulfonamide. The emulsion was similarly coated on heavy white baryta-coated paper.

The emulsion layer was coated after formation and while still wet with a coating composition of the following formula:

| | | |
|---|---|---|
| Gelatin | grams | 20.0 |
| N-furoylacet-N'-benzoylacetbenzidine | do | 0.5 |
| 5 N NaOH | ccs | 0.5 |
| Ethanol | ccs | 75.0 |
| Water | ccs | 450.0 |

The emulsion layer set into a firm gel in a few seconds.

Exposure was made on this element and color development in the following solution:

| | | |
|---|---|---|
| Diethyl-p-phenylenediamine hydrochloride | grams | 3 |
| NaOH | do | 2 |
| KBr | do | 1 |
| $Na_2SO_3$ | do | 5 |
| Water to | liter | 1 | yielded a strong yellow-green image.

Results similar to that described in Example III can be obtained by first coating a film base or prepared paper base with the latter solution and then coating the emulsion layer onto the sublayer. In fact, one may use the acylacetamides in various types of sublayers or overcoatings which are in contact with any layers composed of the hydroxyl polymers and thereby cause gelling of such layers. For instance they may be incorporated in any coating composition or "subbing" solution used to form a substratum coating for an emulsion layer composed of or containing such hydroxyl polymers. These subbing solutions generally consist of gelatin, a natural or synthetic resin, and a phenol in water, a water-ethanol or acid-solvent mixture.

*Example IV*

A 5% aqueous-alcohol solution of the hydroxyl polymer described in Example I is applied to the surface of a piece of fabric and run immediately through a bath of the following composition:

| | | |
|---|---|---|
| Dibenzoylacetbenzidine | grams | 5 |
| Water | ccs | 25 |
| 5 N NaOH | ccs | 7.5 |
| Ethanol | ccs | 75 | to set the hydroxyl polymer in a firm non-running gel. A strong flexible protective coating results.

In place of the specific acylacetamides disclosed in the above examples there may be substituted one or more other such compounds. Mixtures of two or more of such compounds obviously can be used. Suitable additional compounds of this type include dibenzoylacetbenzidine, benzoylacetnaphthalide, furoyl-benzoyl acetbenzidine, acetoacet-2.5-dichloroanilide, acetoacet - m - nitroanilide, acetoacet-p-anisidine, acetoacet-p-aminoanilide, p-phenyl-azoacetoacetanilide, acetone dicarboxanilide, N-benzoylacet - p - phenetidine.

Still others are described in United States Patents 2,108,602; 2,140,540; 2,283,276; 2,299,641; and 2,319,426. As stated above these compounds are preferably used in aqueous alkali metal solutions which means that the acylacetamides are dissolved in the form of their alkali metal salts.

Similarly in place of the particular hydroxyl polymers described in the above examples there may be used many other specific polymers and interpolymers of this type. Thus any of the hydrophilic hydrolyzed ethylene/vinylacetate interpolymers described in the aforementioned applications can be used and gelled in a similar manner.

Other useful hydroxyl polymers include the polyvinylacetals which contain a number of

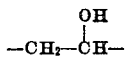

groups per molecule. These polymers may contain color former nuclei or may contain inactive substituent acetal groups. When color former groups are initially present the final products are capable of forming two dyes, one by coupling with such groups and the other by coupling with the acylacetamide residues introduced. When the two components yield the same color of dye this means that an increase in dye density may be obtained. By using dyes of different shades one can obtain a variety of shades of finished dye image. However, even when the two dyes formed have widely different absorption characteristics one color can be dominant and mask the other color. Since small amounts of the acylacetamide give marked gelling characteristics the composite color picture will often not be materially affected as to proper color values if the main color formers yield strong color values or the main color formers yield strong dense dye images.

Suitable additional polyvinylacetal color formers which can be gelled by the addition of the acylacetamides are described in United States Patents 2,310,943 and 2,320,422. Still other useful color formers which can be gelled in the form of emulsions, dispersions, layers, etc., by the use of the acylacetamides are described in the United States patent applications Serial Nos. 528,946, now Patent 2,415,381, and 528,943, now Patent 2,397,865.

The invention is not limited to the gelling of compositions or layers for photographic color processes. On the contrary, the gels and gelled layers can be used for many purposes. Silver halide emulsion layers containing gelled hydroxyl polymer binding agents for instance can be exposed and developed in any of the conventional black and white or non-color forming developers to produce metallic silver photographs.

Photographic silver halide dispersions in polyvinyl alcohols which have a molecular weight of 6,500 to 20,000 or more for example can be quickly gelled by the addition of small amounts of acylacetamides. Photographic elements containing such gelled layers can be converted into good silver image photographs.

It is advisable to carry out the gelling treatment under neutral or mildly alkaline conditions. An excess of alkali although not harmful requires considerable washing after gelling has taken place.

Irreversible gels and gel layers can be formed by increasing the amount of acylacetamide per part of hydroxyl polymer compound. Amounts in excess of 20% of acylacetamide for instance result in gels which are very firm and difficult to handle. This is due to the fact that if such quantities are added to uncoated emulsions, etc. the preparation will form an instant irreversible gel. Such large quantities also give haze and a frosty appearance to the film. Also gives too much color former.

The processes may also be used for treatment of special papers, fabrics, precipitating hydroxyl polymer foils and fibers, and in preparation and application of insulating materials.

The invention has the advantage that hydrophilic hydroxyl polymer compositions can be gelled in a simple and economical manner. A further advantage resides in the fact that a large class of chemical compounds are available for use. Another advantage resides in the fact that acylametamide compounds can be converted into acylacetamide compounds can be converted into ing them into layers containing a material amount of a hydroxyl polymer. The invention also permits uniform coating of non-setting materials.

As many apparently widely different embodiments of this invention may be made without departing from the spirit and scope thereof, it is to be understood that the invention is not to be limited except as defined by the appended claims.

What is claimed is:

1. The process which comprises treating a layer of a hydroxyl polymer which contains a large number of recurring intralinear

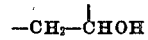

groups taken from the group consisting of polyvinyl alcohol, partially hydrolyzed vinyl ester polymers and polyvinyl acetals with an aqueous alkaline solution containing a compound taken from the group consisting of acylacetamides of aromatic amines which have an unsubstituted methylene group between the two carbonyl groups and their alkali metal salts.

2. The process which comprises treating a layer composed of polyvinyl alcohol with an aqueous alkaline solution containing a compound taken from the group consisting of acylacetamides of aromatic amines which have an unsubstituted methylene group between the two carbonyl groups and their alkali metal salts.

3. The process which comprises treating a layer composed of a hydrophilic hydrolyzed ethylene/vinyl acetate interpolymer with an aqueous alkaline solution containing a compound taken from the group consisting of acylacetamides of aromatic amines which have an unsubstituted methylene group between the two carbonyl groups and their alkali metal salts.

4. The process which comprises treating a layer of a hydroxyl polymer which contains a large number of recurring intralinear

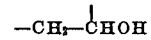

groups taken from the class consisting of polyvinyl alcohol, partially hydrolyzed vinyl ester polymers and polyvinyl acetals with an aqueous alkaline solution containing an alkali metal salt of an acylacetamide of an aromatic amine which have an unsubstituted methylene group between the two carbonyl groups and their alkali metal salts.

5. The process which comprises treating a layer of a hydroxyl polymer which contains a large number of recurring intralinear

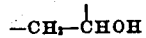

groups taken from the group consisting of polyvinyl alcohol, partially hydrolyzed vinyl ester polymers and polyvinyl acetals with an aqueous solution and treating said layer while wet with an aqueous ethanol solution containing a compound taken from the group consisting of acylacetamides of aromatic amines which have an unsubstituted methylene group between the two carbonyl groups and their alkali metal salts.

6. A process as set forth in claim 5 wherein said acylacetamide is acetoacetanilide.

7. A process as set forth in claim 5 wherein said acylacetamide is N-furacylacet-N'-benzoylacetbenzidine.

8. A process as set forth in claim 5 wherein said acylacetamide is dibenzoylacetbenzidine.

OTIS WILLARD MURRAY.

REFERENCES CITED

The following references are of record in the file of this patent:

UNITED STATES PATENTS

| Number | Name | Date |
|---|---|---|
| 2,036,092 | Morrison et al. | Mar. 31, 1936 |
| 2,186,735 | Schneider et al. | Jan. 9, 1940 |
| 2,200,306 | Schneider et al. | May 14, 1940 |
| 2,213,763 | Gordon | Sept. 3, 1940 |
| 2,250,664 | Watkins | July 29, 1941 |
| 2,272,191 | Fierke | Feb. 10, 1942 |
| 2,284,877 | Martinez | June 2, 1942 |
| 2,304,940 | Mannes et al. | Dec. 15, 1942 |
| 2,310,943 | Dorough et al. | Feb. 16, 1943 |
| 2,320,422 | Frohlich | June 1, 1943 |
| 2,323,503 | Wilson | July 6, 1943 |
| 2,377,302 | Wilson | May 29, 1945 |
| 2,380,032 | Dorough et al. | July 10, 1945 |
| 2,405,523 | Sease et al. | Aug. 6, 1946 |
| 2,415,381 | Woodward | Feb. 4, 1947 |
| 2,415,382 | Woodward | Feb. 4, 1947 |